April 10, 1951    H. W. CARNES    2,548,346
INDEPENDENT DETECTOR ROLL FOR GRADING MACHINES
Filed Dec. 19, 1946    5 Sheets-Sheet 1
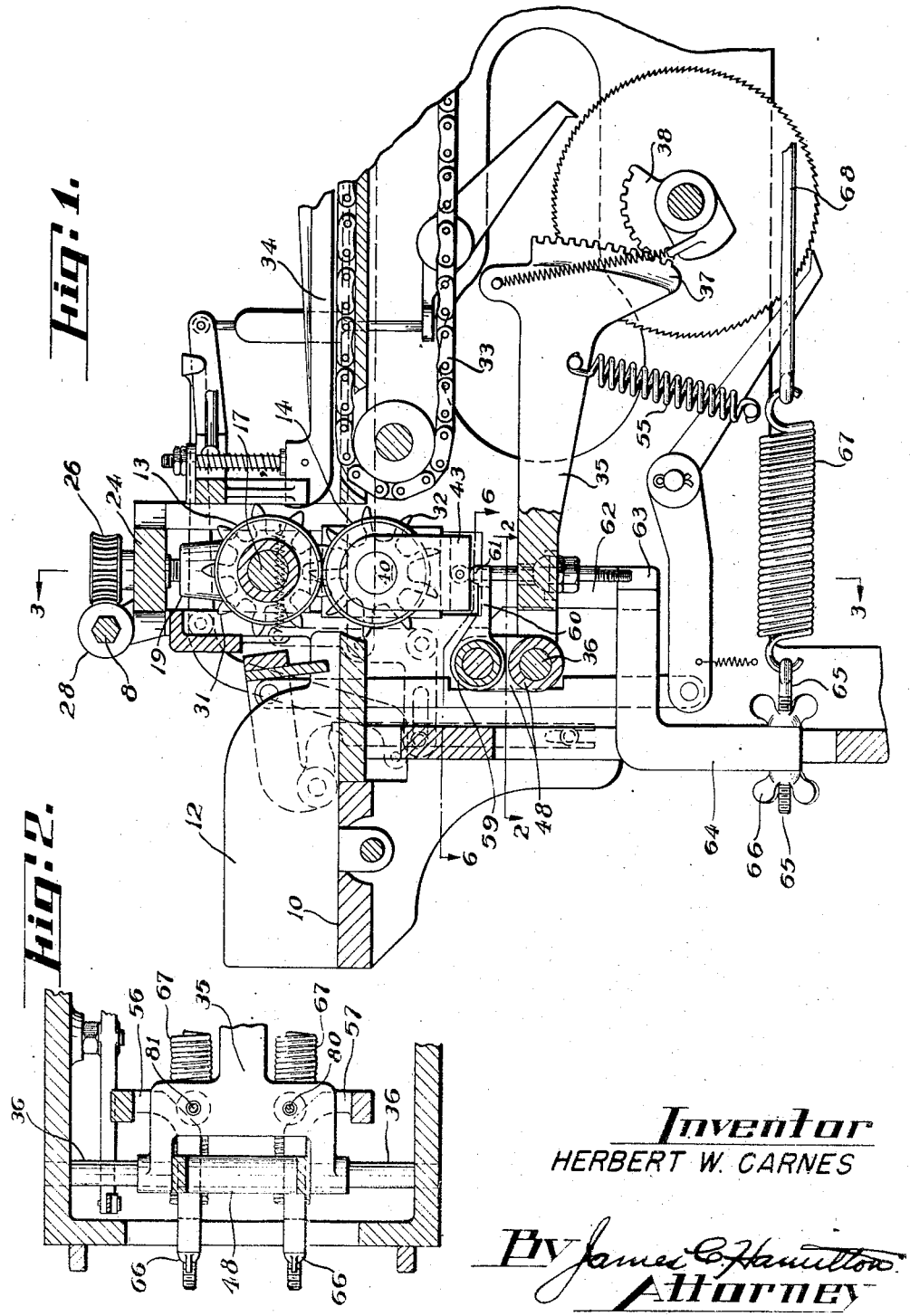
Inventor
HERBERT W. CARNES
By James C. Hamilton
Attorney

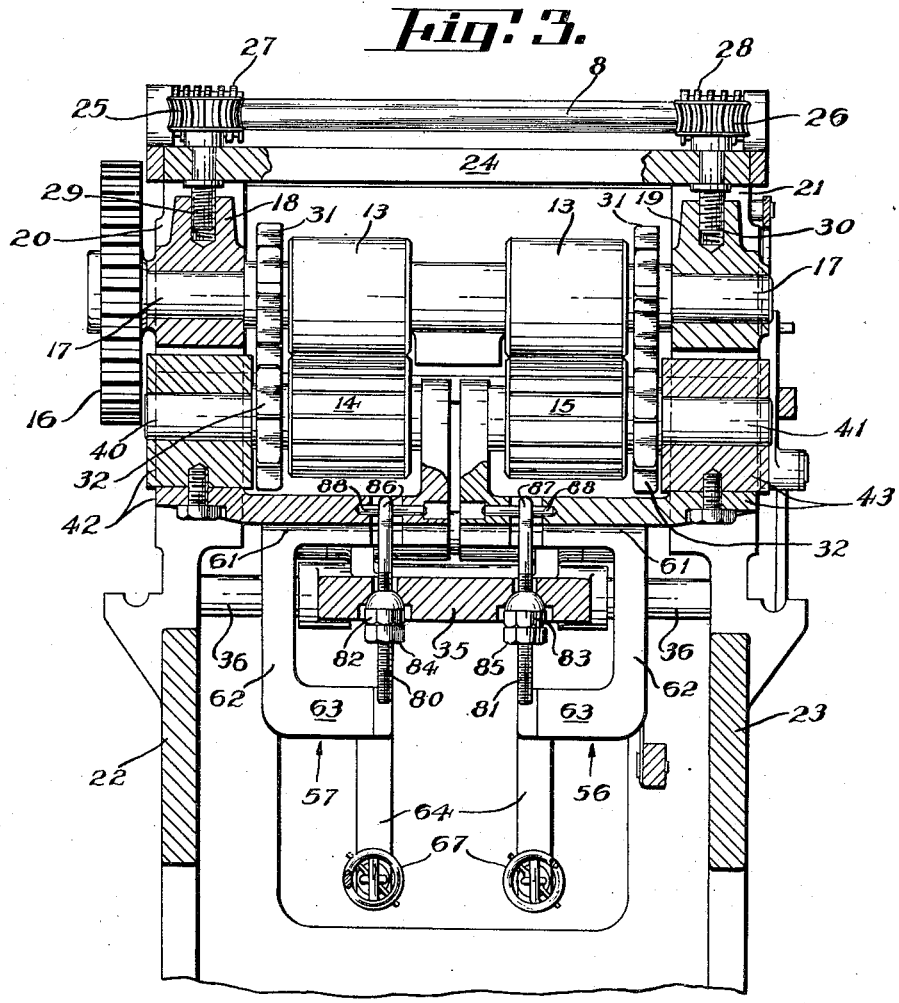

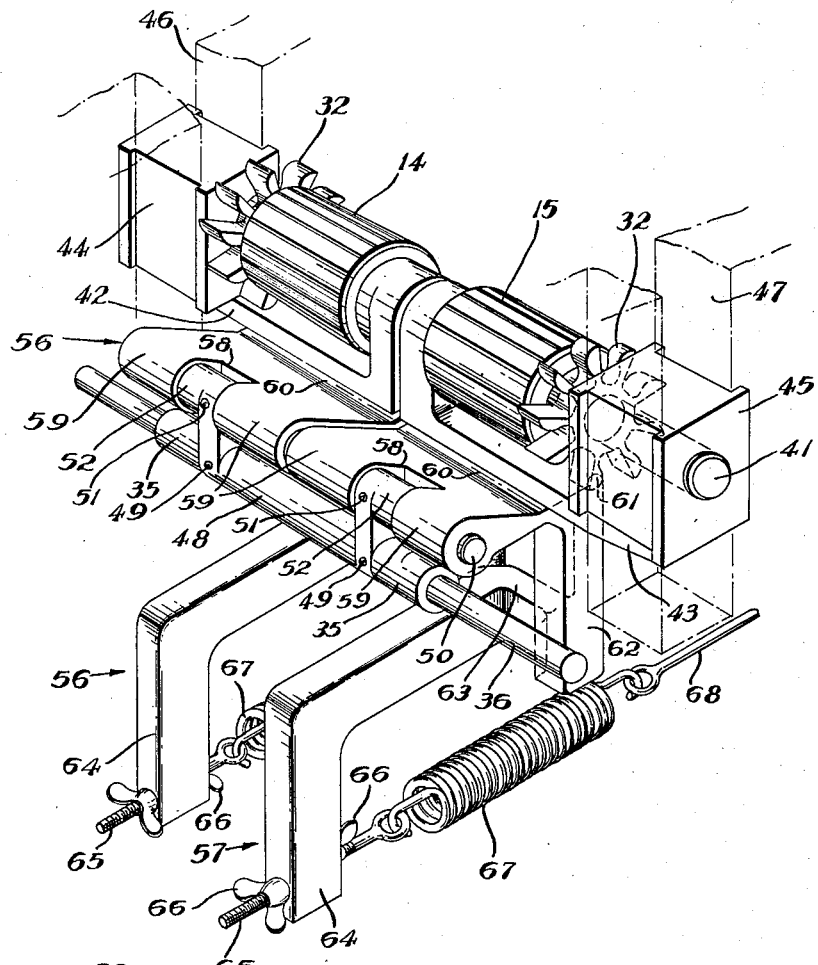
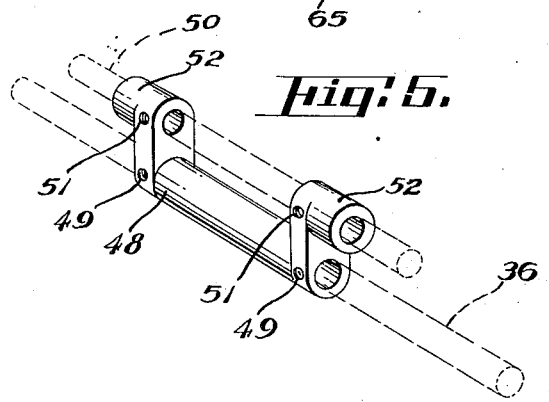

April 10, 1951     H. W. CARNES     2,548,346
INDEPENDENT DETECTOR ROLL FOR GRADING MACHINES
Filed Dec. 19, 1946     5 Sheets-Sheet 4

Inventor
HERBERT W. CARNES
By James C. Hamilton
Attorney

April 10, 1951  H. W. CARNES  2,548,346
INDEPENDENT DETECTOR ROLL FOR GRADING MACHINES
Filed Dec. 19, 1946

Inventor
HERBERT W. CARNES
By James C. Hamilton
Attorney

Patented Apr. 10, 1951

2,548,346

UNITED STATES PATENT OFFICE 2,548,346

INDEPENDENT DETECTOR ROLL FOR GRADING MACHINES

Herbert W. Carnes, Swampscott, Mass., assignor to North American Research Corporation, Cambridge, Mass., a corporation of Massachusetts Application December 19, 1946, Serial No. 717,237

4 Claims. (Cl. 33—147)

1

This invention relates to grading machines suitable for grading soles, tops and other blanks of stock used in the manufacture of shoes, and more particularly to the well-known Nichols, Cogswell and Johnston type of grading machines illustrated in a series of patents granted to former inventors, for example Patent No. 1,743,320, to Leander A. Cogswell, dated January 14, 1930 to which the present invention is herein applied.

The characteristic function of this class of grading machines is the determination, by a detecting and measuring device, of the thickness of the thinnest portion of the blank, or of a selected area of the blank, and the transmission of the value so determined to mechanisms suitable for performing other operations. The term grading as established in this art is generic and includes evening or skiving the blank as a whole down to the thickness of its thinnest portion, stamping or marking each blank with a character indicating its thickness grade, indicating on a visual indicator the grades of the several blanks, and sorting or distributing the blanks in accordance with their grade measurements. Two or more species of grading mechanisms may be and commonly are contained in one machine, and the term grading is used herein in its generic sense unless otherwise specified.

Whatever may be the kinds of grading to be performed, the appropriate grading mechanisms are adjusted, through setting and transmission mechanisms, in accordance with the minimum thickness of each blank as determined by the detecting and gauging or measuring device which acts on each blank as successive blanks are fed one by one through the machine. The measurements are usually made in terms of "irons" ($1/48$ of an inch), and the measurement transmitted to the grading devices is usually the thickness measurement in irons or fractions of irons, which is nearest to but not greater than the thickness of the thinnest part of the blank as determined by the measuring device. In the machine herein illustrated the invention relates particularly to a new means of measuring the blank thickness by the use of two independent detector rolls which are in contact with different parts of the blank, the setting and transmission mechanisms being responsive to the minimum thickness detected by either roll. Other features and combinations will be hereinafter described and pointed out in the claims.

In boot and shoe making it is desirable, and indeed well nigh essential for the best results, that in the completed shoe the exposed edge of the sole or top be of substantially uniform thickness, especially at the opposite side edges of the forepart. Consequently, it is the thickness of the marginal area, especially along the side edges of a sole, which should determine the thickness grade of the sole, and to which thickness as a whole should be evened, or skived down.

Heretofore the detecting and measuring mechanisms of grading machines has comprised a pair of cylindrical rolls between which the sole or other blank passes. One roll moved yieldingly toward and from the other as thinner and thicker areas of the blank were encountered, and the grading devices were set and actuated in accordance with the closest position of the rolls during the passage of a blank. Attempts have been made partially to correct this defect by dividing one or both of the rolls into two spaced apart sections on a common shaft, so that only the areas near the outer edges of the blanks would come in contact with the rolls. See, for example, the Nichols Patent No. 1,582,140 dated April 27, 1926 and the Cogswell Patent No. 1,726,610 dated September 3, 1929. This arrangement, although an improvement, was open to the same objections (less only in degree) as the continuous rolls. Due to the fact that the two detector roll sections were mounted on a common shaft, so that neither half could act independently of the other, any difference in the thickness near the two edges of the blank caused tilting of the shaft, which resulted in excessive wear in the slide ways and journal boxes and inaccuracies in grading. Some attempts have heretofore been made to eliminate this difficulty by the use of individual detector rolls mounted on the ends of pivoted levers, as illustrated in the Barber Patent No. 1,125,444 dated January 19, 1915 and the Metcalf Patent No. 2,325,011. In both these examples the detector rolls are free to cock and cause twisting and binding of the levers. Furthermore, the path of the rolls is circular, rather than purely vertical, so that a geometric error, commonly called the "cosine error," was introduced.

In the present invention, all of the foregoing objections in detecting devices have been substantially overcome by provision of a pair of independent detector rolls which move purely in a vertical plane, each roll being yieldingly supported over its entire length by means of a lever, the bearing surfaces of which extend beyond the ends of the roll.

It is accordingly the principal object of this invention to improve the quality of grading by introducing independent yieldable detector rolls which are free from cocking action and which follow a purely vertical path in the slideways below the fixed upper roll.

Another object is to provide improved detecting apparatus which may be quickly and easily substituted for the older detecting mechanism in grading machines of the type shown in the above-mentioned patent to Cogswell No. 1,743,320 dated January 14, 1930.

Another object is to improve the accuracy of the grading and at the same time reduce friction in the slideways and journal boxes to a minimum, thereby permitting faster operation and greatly increasing the rate of production of grading machines of the type herein referred to.

These and other objects, aspects and features of the invention will become more fully apparent from the following description. The description refers to drawings in which:

Fig. 1 is a fragmentary partial cross-section taken through that portion of the machine shown in Fig. 5 of the said Cogswell patent with which the present invention is concerned, particularly illustrating the grading rolls and transmission mechanism. Mechanisms for skiving or other operations are omitted for the sake of clarity.

Fig. 2 is a fragmentary plan cross-section of the pivoted yoke end of the transmission lever;

Fig. 3 is a fragmentary cross-section taken on line 3—3 of Fig. 1;

Fig. 4 is a perspective view of the invention substituted for the old detecting mechanism in the grading machine shown in the patent to Cogswell No. 1,743,320 dated January 14, 1930, dot-and-dash lines indicating slideways in the frame of the machine;

Fig. 5 is a perspective detail of a link member removed from the assembly shown in Fig. 4, the dotted lines indicating shafts;

Figure 8:
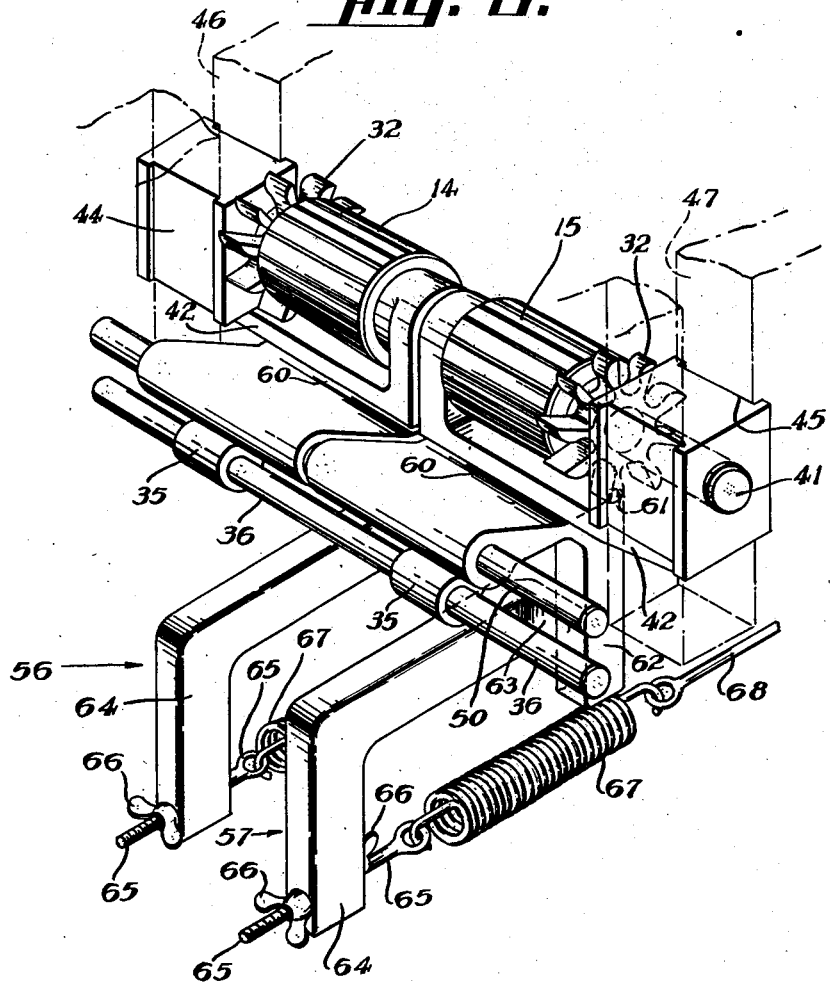
Fig. 8 is a perspective view of similar mechanism to that shown in Fig. 4 in which the link member shown in Fig. 5 is not used.

As previously mentioned, this invention is an improvement over the detecting mechanism shown in the Cogswell Patent No. 1,743,320 dated January 14, 1930 and is concerned with two types of installation. The embodiment shown in Figs. 4 and 5 may be readily installed on grading machines of this type in the field without returning the machines to the factory. In the factory or in the building of a new machine, the mechanism shown in Fig. 8 would be used and the link shown in Fig. 5 would be dispensed with. The reason for this difference will be explained herein in more detail.

Figure 9:
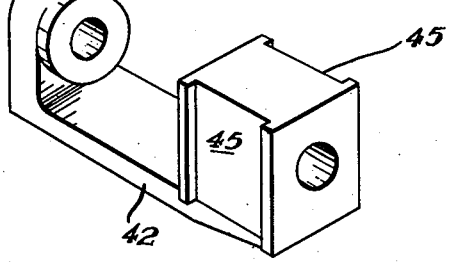
Fig. 9 is a perspective view of one of the journal box bearing members removed from the assemblies shown in Figs. 1, 3, 4, and 8.

Referring more in detail to the drawings, and especially to Fig. 1, the blanks are fed into the machine in the usual manner over a table 10, between guides, one of which is indicated at 12, to the feed rolls 13 and 14, the roll 14 shown in Fig. 1 being the independent roll located on the far side of the machine, independent roll 15 being on the near side of the machine, shown in Figs. 3, 4 and 9. In the present application, roll 13 is of the type usually referred to as "a divided roll" consisting of two spaced apart roll sections mounted on a common shaft. The divided roll 13 is the driving roll being driven by the gear 16 which is fixed to the shaft 17. The drive shaft 17 is mounted in the journal boxes 18 and 19 operating in the slideways 20 and 21 respectively. Across the two side frames 22 and 23 of the machine is located a bar member 24 in which are mounted worm wheels 25 and 26 and which engage with worms 27 and 28, respectively, which may be rotated by means of the hexagonal shaft 8. The bearings of the worm wheels 25 and 26 journalled in the member 24 are further provided with threaded extension screws 29 and 30 threaded in bosses 18 and 19 provided for the purpose on the journal boxes 20 and 21.

In grading blanks having materially different thicknesses, such as heavy outer soles as compared to thin inner soles, the roll 13 is usually adjusted up or down, as the case may be, by means of an S wrench of proper size being applied to the hexagonal shaft 8 fixed to the worms 27 and 28. Once this adjustment is made, the roll 13 is fixed throughout the grading operation so as to provide a reference with respect to which the independent rolls 14 and 15 determine the blank thickness. Modified wringer gears 31 and 32 transmit the driving power to the independent rolls 14 and 15.

When the blank leaves the rolls 13, 14, and 15 it passes to a continuously moving chain conveyor 33 which carries it to the rear end of the machine where it is skived down to the minimum thickness as detected by the independent rolls 14 and 15 and transmitted by the transmission mechanism to the setting mechanism of the skiving knife. During the conveying operation the presser shoe 34 maintains the blank within the grip of the conveyor chain 33.

At 35 is indicated a transmission lever, the front end of which is journalled around the fixed shaft 36, the opposite end of which is provided with a segmental gear 37 engaging with the segmental gear 38 from which all skiving, marking or other apparatus is set. For a more complete description of the operation of this part of the machine, the aforementioned Cogswell patent may be referred to. Further description, however, is not necessary for the understanding of the present invention. The improvement in the gauging arrangement shown herein is adapted for use with any other suitable type of transmission mechanism, the only requirement being that the mechanism be responsive only to successively higher positions of either detector roll during the passage of a blank so that the minimum detected thickness is transmitted to the skiving or other devices.

By an inspection of the drawings, it will be noted that rolls 14 and 15 are similar to each other and the apparatus associated with these independent rolls are the same except that one unit is right-hand and the other is left-hand.

Figs. 4 and 5 illustrate the new mechanism as installed in the old machine described in the said Cogswell patent. The independent rolls 14 and 15 are fixedly mounted on independent shafts 40 and 41 which in turn are mounted in the journal box assemblies 42 and 43. The outside ends of the journal boxes 42 and 43 are provided with slides 44 and 45 which operate in a vertical plane in the original slideways 46 and 47 of the old machine.

The pivoted end of the transmission lever 35 is formed in the shape of a yoke, as shown more clearly in Fig. 2, and is pivotally mounted on the fixed shaft 36.

In order to substitute the improved mechanism in machines of the Cogswell type above referred to without returning the machine to the factory, a hanger 48, as shown in Fig. 5, has been devised which is set screwed at 49 to the fixed shaft 36, the hanger 48 fitting within the yoke of the transmission lever.

The hanger member 48 being securely fixed to the stationary shaft 36, by means of the set screws 49, is provided with another shaft 50, which is fixed by means of set screws 51 located in the bosses 52, comprising a part of the said hanger 48.

The shaft 36 is the same shaft indicated at 22 in the said Cogswell patent and is fixed against rotation in the frame of the machine. Also, shaft 50 is fixed against rotation in the fixed hanger 48. In a new machine or a machine that is rebuilt at the factory, it is a simple matter to align holes in the frame in which to fix a shaft similar to 50 and under such conditions the hanger 48 is unnecessary.

The yoke of the transmission lever 35 is pivoted on shaft 36 in the same manner as in the Cogswell patent above referred to and is normally urged downwardly by means of the tension spring 55, one end of which is anchored to the frame of the machine, the other end being attached to the lever 35.

Figure 6:
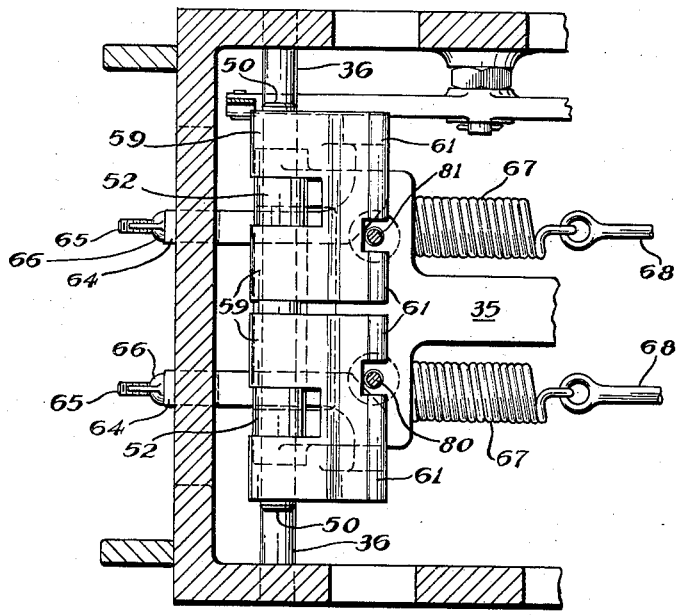
Fig. 6 is a fragmentary plan cross-section partially in elevation and taken on line 6—6 of Fig. 1.
Figure 7:
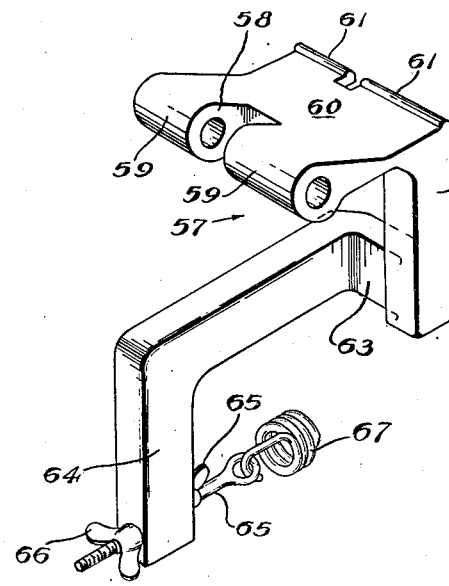
Fig. 7 is a perspective view of one of the hinged levers shown in Fig. 4 removed from the assembly.

Pivoted on the upper shaft 50 are the compression levers, generally indicated at 56 and 57. These levers are similar in every respect except that they are right and left-hand and act independently on the independent detector rolls 14 and 15, respectively. Fig. 7 illustrates lever 57 which is the type shown in Figs. 1, 4, and 6 in which is provided a cut-out area 58 in the hinge portion 59 to accommodate the bearing portion 52 of the hanger 48. Compression lever 57 is further provided with an apron portion 60 terminating in an upwardly extending bead 61 which bears directly against the bottom side of the journal box assembly 43.

From the apron portion of the compression lever 57 and at one side thereof, there is provided a downwardly extending post member 62 to which is fixed an offset portion 63, the free end of which is turned at a right-angle and extended rearwardly under the hinge portion 59 and terminating in a downwardly extended end 64. A threaded adjustment eye bolt 65 is mounted through the extended end 64 of each of the levers 57 and 58 having wing nuts 66 provided to lock the eye bolts 66 in place after adjustment has been made. Tension coil springs 67 engage the eye bolts 65 and are anchored to any convenient fixed part of the machine by means of the rods 68.

It will thus be seen that when the assembly is installed in the said Cogswell machine, as indicated in the drawings, and the springs 67 are placed under tension, the levers 56 and 57 will fulcrum on the shaft 50 and by virtue of the contact of the bead portion 61, engaged with the under side of the journal box assembly 43, the detector rolls 14 and 15 will be urged upwardly toward the fixed roll 13.

Connecting with the bottom portion of the journal box assemblies 42 and 43 are transmission linkage eye bolts 80 and 81, the lower portions of which are threaded and provided with the ball nuts 82 and 83 and the respective lock nuts 84 and 85. The ball nuts 82 and 83 are universally seated in appropriate sockets formed in the under side of the transmission lever 35, clearly shown in Fig. 3 of the present invention. The upper end of the linkage bolts comprise eye portions 86 and 87 through which are positioned pivot pins 88 and 89 secured in the journal box assemblies 42 and 43, respectively.

By an inspection of the drawing it will be apparent that the transmission bolt members 80 and 81 pivot freely when the lever 35 swings up and down on the shaft 36 and the journal box assemblies 42 and 43 move up and down in the slideways of the machine. Furthermore, it will be apparent that the transmission lever 35 may be lifted by either one of the journal box assemblies 42 or 43. If one journal box assembly rises and the other does not, the linkage bolt connecting the lever 35 to the journal box assembly remains at a lower lever and temporarily recedes away from the lever 35 at the ball and socket connection. In this manner a shoe sole having a wedge-shaped cross-section permits the independent roll under the thin portion to rise, moving the lever 35 upwardly without interference from the roll or journal box assembly on the other side of the machine.

It is apparent that a construction and arrangement of the members similar to that shown in Fig. 7 allows the independent rolls to move freely in a vertical plane, and that cocking and jamming of the journal box assemblies with the resulting excessive friction and wear are eliminated. As a consequence, grading machines of this type may be run much faster with the improved roll arrangement than was formerly possible. It has been found that, even at speeds approaching the limit of an operator's ability to tend the machine, no loss of accuracy or excessive vibration or wear are observed. The greatly increased rate of production resulting from high grading speed, together with improved accuracy of grading, is of considerable advantage to a manufacturer processing blanks of this type.

Since certain changes may be made in the above-described article and different embodiments of the invention could be made without departing from the scope thereof, it is intended that all matter contained in the above description or shown in the accompanying drawings shall be interpreted as illustrative only and not in a limiting sense.

What is claimed is:

1. In a machine of the type described having a pivoted transmission lever for transmitting thickness of shoe sole blanks, and an upper roll, adjustably fixed against vertical movement, under which said blanks are passed; independent detector rolls slidably mounted in the frame of said machine, below said fixed roll and supported at each end in bearing members; hinge contact levers yieldingly supporting said detector rolls and pivoted in said machine; tension springs anchored in said machine and engaging said contact levers; a transmission lever linkage indirectly connected to said independent rolls, and connected to said transmission lever in such a manner as to lift said lever when either of said detector rolls moves upward but to move freely through said lever when one of said rolls is depressed.

2. Apparatus in accordance with claim 1 wherein the hinge contact levers have means in pivotal engagement with said members and said engagement means comprises a rib on said lever adapted to make contact with said members, throughout their entire length.

3. Apparatus in accordance with claim 1, wherein the axes of said upper roll and said detector rolls all lie in the same plane.

4. Apparatus in accordance with claim 3, said detector rolls being mounted on the machine in ways running parallel to said plane.

HERBERT W. CARNES.

REFERENCES CITED

The following references are of record in the file of this patent:

UNITED STATES PATENTS

| Number | Name | Date |
| --- | --- | --- |
| 1,125,443 | Barber | Jan. 19, 1915 |
| 1,163,115 | Stiggins | Dec. 7, 1915 |
| 1,582,140 | Nichols | Apr. 27, 1926 |
| 1,671,737 | Norton | May 29, 1928 |
| 1,726,610 | Cogswell | Sept. 3, 1929 |
| 1,743,320 | Cogswell | Jan. 14, 1930 |
| 2,187,204 | Johnston | Jan. 16, 1940 |
| 2,315,863 | Metcalf | Apr. 6, 1943 |
| 2,325,011 | Metcalf | July 20, 1943 |